US008247027B2

United States Patent
Mukkamala et al.

(10) Patent No.: US 8,247,027 B2
(45) Date of Patent: Aug. 21, 2012

(54) COMPOSITE PARTICLES

(75) Inventors: Ravi Mukkamala, Lansdale, PA (US); Chao-Jen Chung, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 414 days.

(21) Appl. No.: 12/586,747

(22) Filed: Sep. 25, 2009

(65) Prior Publication Data

US 2010/0087315 A1     Apr. 8, 2010

Related U.S. Application Data

(60) Provisional application No. 61/195,323, filed on Oct. 6, 2008.

(51) Int. Cl.
*B05D 3/00* (2006.01)
*B05D 7/00* (2006.01)
*B30B 27/00* (2006.01)
*B41M 5/42* (2006.01)

(52) U.S. Cl. ......... 427/195; 427/222; 428/407; 503/226

(58) Field of Classification Search ................. None
See application file for complete search history.

(56) References Cited

U.S. PATENT DOCUMENTS

| | | | |
|---|---|---|---|
| 5,273,824 A | 12/1993 | Hoshino et al. | |
| 5,344,487 A | 9/1994 | Whalen-Shaw | |
| 5,440,402 A | 8/1995 | Okuda et al. | |
| 5,454,864 A | 10/1995 | Whalen-Shaw | |
| 5,639,805 A | 6/1997 | Park et al. | |
| 5,663,224 A | 9/1997 | Emmons et al. | |
| 5,756,210 A | 5/1998 | Dupuis et al. | |
| 6,080,802 A | 6/2000 | Emmons et al. | |
| 6,139,961 A | 10/2000 | Blankenship et al. | |
| 6,297,296 B1 | 10/2001 | Wexler | |
| 6,780,820 B2 | 8/2004 | Bobsein | |
| 2005/0287313 A1 | 12/2005 | Chen et al. | |
| 2006/0156956 A1 | 7/2006 | Gane et al. | |
| 2008/0038475 A1 | 2/2008 | Boschat et al. | |

FOREIGN PATENT DOCUMENTS

| | | |
|---|---|---|
| EP | 0 959 176 A1 | 11/1999 |
| EP | 1 197 503 A2 | 4/2002 |
| WO | WO 2007/141260 A1 | 12/2007 |
| WO | WO 2007/141271 A1 | 12/2007 |
| WO | WO 2008/006474 A1 | 1/2008 |

OTHER PUBLICATIONS

Liu, et al—Crosslinkable Composite Spheres and Capsules Synthesized by Heterocoagulation—Macromoleuclar Rapid Communications, 2005, 26 pgs. 1002-1007.
Caruso, Frank & Mhwald, Helmuth; Preparation and Characterization of Ordered Nanoparticle and Polymer Composite Multilayers on Colloids; Langmuir 1999, vol. 15, No. 23 8276-8281.
Furusawa, K. & Anzai, C.; Preparation of Composite Fine Particles by Heterocoagulation; Colloid & Polymer Science 265, 882-888 (1987).
Okubo, M.; He, Y. & Ichikawa, K.; Analysis of "stepwise" heterocoagulation process of small cationic polymer particles onto large anionic polymer particles using dynamic light scattering; Colloid & Polymer Science 269, 125-130 (1991).

*Primary Examiner* — Bruce H Hess
(74) *Attorney, Agent, or Firm* — Stephen T. Falk

(57) ABSTRACT

In the present invention a composite particle including: a first polymeric particle having a diameter of from 100 nm to 3.5 microns including a core and a shell: the core including, when dry, at least one void; and the shell polymer having a calculated glass transition temperature("Tg") greater than 50° C.; and a second polymeric particle disposed on the surface of the first polymeric particle, the second polymeric particle having a minimum film-forming temperature of greater than 20° C.; wherein the ratio of the diameter of the first polymeric particle to the diameter of the second polymeric particle is from 1 to 50; and wherein the ratio of the weight of the first polymeric particle to the weight of the second polymeric particle is from 0.1 to 40, is provided. In certain embodiments the composite particle further includes pigment particles having a diameter of from 10 nm to 5 microns disposed on the surface of the composite particle, wherein the ratio of the weight of the pigment particles to the weight of the composite particle is from 0.1 to 10. Also provided is a method for forming the composite particles, a thermosensitive recording material including the composite particles and a method for providing the thermosensitive recording material.

2 Claims, No Drawings

US 8,247,027 B2

COMPOSITE PARTICLES

This invention claims priority to U.S. Provisional Application No. 61/195,323 filed Oct. 6, 2008.

This invention relates to a composite particle including, when dry, a void, the particles suitable for providing insulating properties and levels of opacity in dry compositions. More particularly this invention relates to a composite particle including: a first polymeric particle having a diameter of from 100 nm to 3.5 microns including a core and a shell: the core including, when dry, at least one void; and the shell polymer having a calculated glass transition temperature("Tg") greater than 50° C.; and a second polymeric particle disposed on the surface of the first polymeric particle, the second polymeric particle having a minimum film-forming temperature of greater than 20° C.; wherein the ratio of the diameter of the first polymeric particle to the diameter of the second polymeric particle is from 1 to 50; and wherein the ratio of the weight of the first polymeric particle to the weight of the second polymeric particle is from 0.1 to 40. Optionally, the composite particle may further include pigment particles having a diameter of from 10 nm to 5 microns disposed on the surface of the composite particle, wherein the ratio of the weight of the pigment particles to the weight of the composite particle is from 0.1 to 10. In addition, the invention relates to a method for forming the composite particle, a thermosensitive recording material including the composite particle and a method for forming the thermosensitive material.

Patent Publication No. WO 2008006474 discloses a heat-sensitive recording material including hollow sphere pigment in the form of a composite pigment with nanoscale pigment particles attached to the surface of an organic hollow sphere pigment through the mediation of a suitable adhesive such as a solution copolymer derived from a dicarboxylic acid and a diamine. However, improvements in the efficacy of these coatings have still been sought. In particular, in the use of these pigments improvements in wax absorption of the insulating coatings including these pigments are desired so as to engender a minimum of transfer of the wax used in the thermosensitive coating to the print heads in the thermosensitive recording process. It has now been found that the composite particles of the present invention provide insulating layers having such performance.

In a first aspect of the present invention, there is provided a composite particle comprising: a first polymeric particle having a diameter of from 100 nm to 3.5 microns comprising a core and a shell: said core comprising, when dry, at least one void; and said shell polymer having a calculated glass transition temperature("Tg") greater than 50° C.; and a second polymeric particle disposed on the surface of said first polymeric particle, said second polymeric particle having a minimum film-forming temperature of greater then 20° C.; wherein the ratio of the diameter of said first polymeric particle to the diameter of said second polymeric particle is from 1 to 50; and wherein the ratio of the weight of said first polymeric particle to the weight of said second polymeric particle is from 0.1 to 40.

In a second aspect of the present invention there is provided a method for forming a composite particle comprising: (a) forming a first aqueous dispersion comprising a first polymeric particle having a diameter of from 100 nm to 3.5 microns comprising a core and a shell, said first polymeric particle bearing a first charge: said core comprising, when dry, at least one void; and said shell polymer having a calculated glass transition temperature("Tg") greater than 50° C.; (b) forming a second aqueous dispersion comprising a second polymeric particle, said second polymeric particle bearing a charge opposite to that of said first polymeric particle, said second polymeric particle having a minimum film-forming temperature of greater than 20° C.; and (c) admixing said first aqueous dispersion and said second aqueous dispersion; wherein the ratio of the diameter of said first polymeric particle to the diameter of said second polymeric particle is from 1 to 50; and wherein the ratio of the weight of said first polymeric particle to the weight of said second polymeric particle is from 0.1 to 40.

In a third aspect of the present invention there is provided a thermosensitive recording material comprising a support bearing thereon a first layer comprising composite voided particles as described above and, disposed on said first layer, a thermosensitive recording layer.

In the fourth aspect of the present invention there is provided a method for providing a thermosensitive recording material comprising: forming a composition comprising composite voided particles as described above; applying a first layer of said composition on a support; and applying a thermosensitive recording layer on said first layer.

The present invention relates to a composite particle including: a first polymeric particle having a diameter of from 100 nm to 3.5 microns including a core and a shell: the core including, when dry, at least one void; and the shell polymer having a calculated glass transition temperature("Tg") greater than 50 ° C. Polymeric particles including, when dry, one or more voids have been disclosed in which the void was generated, for example, by complete or partial hydrolysis and dissolution of a core polymer, by swelling of the core polymer with acid, base or nonionic organic agents with restricted subsequent collapse of the particle, and the like. In a preferred embodiment the first particle is formed by an aqueous multistage emulsion polymerization followed by swelling with a base. Such multistage processes are disclosed in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; and 6,896,905; as well as in European Patent Applications EP 267,726A, EP 331,421A and EP 915,108A.

The stages of the preferred multistage first polymer particles of the present invention include a core stage polymer and a shell stage polymer. The core and shell may each, independently, include more than one stage. There may also be one or more intermediate stages. An intermediate stage polymer, when present, partially or fully encapsulates the core and itself is partially or fully encapsulated by the first shell. The intermediate stage, referred to as a "tiecoat" herein, may be prepared by conducting an emulsion polymerization in the presence of the core. The shell polymer partially or fully encapsulates the core polymer and, if present, the tiecoat polymer.

The cores of the preferred multistage polymers are emulsion polymers that include, as polymerized units, from 5% to 100%, preferably from 20% to 60%, and more preferably from 30% to 50% by weight, based on the weight of the core, of at least one hydrophilic monoethylenically unsaturated monomer and from 0 to 95% by weight, based on the weight of the core stage polymer, of at least one nonionic monoethylenically unsaturated monomer. Cores containing at least five percent by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence. This process also contemplates, and includes in the term "hydrophilic monoethylenically unsaturated monomer," the use of a nonpolymeric compound containing at least one carboxylic acid group which is absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomers useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred. Suitable nonpolymeric compounds containing at least one carboxylic acid group include $C_6$-$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like. Suitable nonionic monoethylenically unsaturated monomers for making the hydrophilic core polymer include styrene, .alpha.-methyl styrene, p-methyl styrene, t-butyl styrene, vinyltoluene, ethylene, vinyl acetate, vinyl chloride, vinylidene chloride, (meth)acrylonitrile, (meth) acrylamide, ($C_1$-$C_{20}$) alkyl or ($C_3$-$C_{20}$) alkenyl esters of (meth)acrylic acid, such as methyl(meth)acrylate, ethyl(meth)acrylate, butyl(meth) acrylate, 2-ethylhexyl(meth)acrylate, hydroxyethyl(meth) acrylate, hydroxypropyl(meth)acrylate, benzyl(meth)acrylate, lauryl(meth)acrylate, oleyl(meth)acrylate, palmityl (meth)acrylate, stearyl(meth)acrylate and the like.

The core, whether obtained by a single stage process or a process involving several stages, has an average particle size of from 50 nm to 1.0 micron, preferably from 100 nm to 300 nm, diameter in unswollen condition. If the core is obtained from a preformed or seed polymer, the seed polymer preferably has an average particle size of from 30 nm to 200 nm.

The core may also optionally contain from 0.1% to 20% by weight, alternatively from 0.1% to 10% by weight, based on the total weight of the core, of multiethylenically unsaturated monomer, wherein the amount used is generally approximately directly proportional to the amount of hydrophilic monoethylenically unsaturated monomer used; in other words, as the relative amount of hydrophilic monomer increases, it is acceptable to increase the level of multiethylenically unsaturated monomer. Alternatively, the core polymer may contain from 0.1% to 60% by weight, based on the total weight of the core polymer, of butadiene.

Suitable multiethylenically unsaturated monomers include alpha beta ethylenically unsaturated monocarboxylic acid esters of polyhydric alcohols containing 2.6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenyl ethers; allyl esters of .alpha.,.beta.-unsaturated mono- and dicarboxylic acids having terminal ethylenic unsaturation including allyl methacrylate, allyl acrylate, diallyl maleate, diallyl fumarate, diallyl itaconate and the like.

The shell polymer of the multistage polymer has a Tg of greater than 50° C. and includes, as polymerized units, from 0.3% to 10%, preferably from 0.5% to 10%, by weight based on the weight of the first shell polymer, multiethylenically unsaturated monomer; suitable multiethylenically unsaturated monomers are those disclosed herein for optional use in the core polymer. Styrene is a preferred comonomer. Other suitable monomers which may be used in the formation of the shell polymer include monoethylenically unsaturated monomers as disclosed for the preparation of the core polymer herein, hydrophilic and nonionic. In the event that multiple shell stages are utilized the composition of the shell herein is taken herein as the overall composition of all of the shells.

Tgs of polymers herein are those calculated herein using the Fox equation (T. G. Fox, Bull. Am. Physics Soc., Volume 1, Issue No. 3, page 123(1956)). i.e., for example, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

Glass transition temperatures of homopolymers may be found, for example, in "Polymer Handbook", edited by J. Brandrup and E. H. Immergut, Interscience Publishers.

The monomers used and the relative proportions thereof in the shell should be such that they are permeable to an aqueous or gaseous volatile or fixed basic swelling agent capable of swelling the core. The shell may include, as polymerized units, from 0% to 35%, preferably from 0% to 10%, and more preferably from 0.1% to 10%. by weight based on the weight of the shell, of one or more monoethylenically unsaturated monomers containing acid-functionality such as, for example, (meth)acrylic acid, (meth)acryloxypropionic acid, itaconic acid, aconitic acid, maleic acid, maleic anhydride, fumaric acid, crotonic acid, monomethyl maleate, monomethyl fumarate, monomethyl itaconate, and the like. (Meth) acrylic acid is preferred. Preferably, the proportion of acid-functional monoethylenically unsaturated monomer in the shell polymer does not exceed one-third the proportion thereof in the core polymer.

In forming the first polymeric particles of the present invention, a water-soluble free radical initiator is typically utilized in an aqueous emulsion polymerization. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01% to 3% by weight, based on the total amount of monomer and in a redox system the amount of reducing agent is preferably from 0.01% to 3% by weight based on the total amount of monomer. The type and amount of initiator may be the same or different in the various stages of the multi-stage polymerization. The temperature during various stages of the multi-stage polymerization is typically in the range of from about 10° C. to 100° C. In the case of persulfate systems, the temperature is typically in the range of from 60° C. to 90° C. In redox systems, the temperature is typically in the range of from 30° C. to 70° C.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)laurami-de, N-lauryl-N-polyoxyethylene(3) amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin (C.sub.14-C.sub.16)sulfonate, sulfates of hydroxyalkanols, tetrasodium N-(1,2-dicarboxy ethyl-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)-ethoxyethyl sulfate. The one or more surfactants are generally used at a level of from 0 to 3% based on the weight of the multistage polymer. The one or more surfactants can be added prior to the addition of any monomer charge, during the addition of a monomer charge, or a combination thereof.

The overall diameter of the multistage first polymeric particle is typically from 100 nm to 3.5 microns, and more preferably from 200 nm to 2.0 microns, in unswollen condition (that is, before any neutralization to raise the pH to about 6 or higher). When the hydrophilic core polymer is fully encapsulated, it does not titrate with alkali metal bases under analytical conditions of 1 hour and at room temperature. The extent of encapsulation can be determined by removing samples during the course of the shell polymerizations and titrating with sodium hydroxide.

The void of the latex polymer particles is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), aminoalcohols. volatile lower aliphatic amines (such as trimethylamine and triethylamine), and mixtures thereof. The swelling step may occur during any of the multistage shell polymerization steps, between any of the staged polymerization steps, or at the end of the multistage polymerization process. Providing the multistage emulsion polymer, monomer and swelling agent under conditions wherein there is no substantial polymerization of the monomer can enhance the extent of swelling of the multistage emulsion polymer as is taught in U.S. Pat. Nos. 6,020,435 and 6,252,004.

The weight ratio of core to an intermediate stage or tiecoat, if present, is typically in the range of from 1:0.5 to 1:10, preferably in the range of from 1:1 to 1:7. The weight ratio of core to shell is typically in the range of from 1:5 to 1:20, preferably in the range of from 1:8 to 1:15.

The composite particles of the present invention further include a second polymeric particle disposed on the surface of the first polymeric particle, the second polymeric particle having a minimum film-forming temperature of greater than 20° C.; wherein the ratio of the diameter of the first polymeric particle to the diameter of the second polymeric particle is from 1 to 50, preferably from 1 to 20, and more preferably from 3 to 18; and wherein the ratio of the weight of the first polymeric particle to the weight of the second polymeric particle is from 0.1 to 40, preferably from 0.3 to 20, and more preferably from 0.5 to 10. By "disposed on the surface of the first polymeric particle" herein is meant that the second polymeric particle, distinguished by having a composition different from that of the surface of the first polymeric particle, is bound to the surface region of the first polymeric particle, i.e., held by a force in proximity to the surface of the first particle, in contact with the surface of the first particle including, for example, touching the surface, spread out on the surface, or embedded into the surface. For example, a SEM shows composite particles of this invention including a larger central particle on which are disposed a multiplicity of smaller particles.

By "minimum film-forming temperature" herein is meant the minimum temperature at which an emulsion polymer forms a continuous film, as evidenced by the visual lack of cracking and/or powdery appearance of film and the film integrity, by testing the film on a temperature gradient plate (ICI Sheen MFFT bar SS-3300)) for film toughness, by pushing against the film with a piece of wood or plastic (so as not to scratch the metal plate), until the film resists further cracking, i.e., remains continuous.

The second polymeric particle is typically prepared by emulsion polymerization. The second polymeric particle typically includes at least one copolymerized ethylenically unsaturated monomer such as, for example, a (meth)acrylic ester monomer including methyl (meth)acrylate, ethyl (meth) acrylate, butyl (meth)acrylate, 2-ethylhexyl (meth) acrylate, decyl (meth)acrylate, hydroxyethyl (meth) acrylate, hydroxypropyl (meth) acrylate, ureido-functional (meth)acrylates and acetoacetates, acetamides or cyanoacetates of (meth) acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. In certain embodiments, the emulsion polymer includes less than 5 wt %, or in the alternative, less than 0.1 wt %, based on the weight of the polymer, of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The polymer may include a copolymerized monoethylenically-unsaturated carboxylic acid monomer. Carboxylic acid monomers include, for example, (meth)acrylic acid, crotonic acid, itaconic acid, fumaric acid, maleic acid, monomethyl itaconate, monomethyl fumarate, monobutyl fumarate, maleic anhydride, sulfur acid monomer such as sulfoethyl (meth)acrylate, and phosphorus acid monomer such as 2-phosphoethyl (meth)acrylate, 2-phosphopropyl (meth)acrylate, 3-phosphopropyl (meth)acrylate, and 3-phospho-2-hydroxypropyl (meth) acrylate.

The polymer may include a copolymerized amino or quaternary amine-functional monomer such as for example a dialkylaminoalkyl (meth)acrylate or a quaternized amine monomer.

The emulsion polymerization techniques typically used to prepare the aqueous emulsion polymer are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfate may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed. In the event that the second polymeric particle is prepared by a multistage process incorporating polymers of different composition the composition of the second polymeric particle herein, and hence, the calculated Tg is taken as the overall composition of the particle.

In the method for forming a composite particle of the present invention (a) a first aqueous dispersion is formed including a first polymeric particle having a diameter of from 100 nm to 3.5 microns, the first particle including a core and a shell, the first polymeric particle bearing a first charge; the core including, when dry, at least one void; and the shell polymer having a calculated glass transition temperature ("Tg") greater than 50° C.; (b) a second aqueous dispersion including a second polymeric particle is formed, the second polymeric particle bearing a charge opposite to that of the first polymeric particle, the polymer of the second polymeric particle having a minimum film-forming temperature of greater than 20° C.; and (c) the first aqueous dispersion and the second aqueous dispersion are admixed; wherein the ratio of the diameter of the first polymeric particle to the diameter of the second polymeric particle is from 1 to 50; and wherein the ratio of the weight of the first polymeric particle to the weight of the second polymeric particle is from 0.1 to 40.

The charge of the first polymeric particle and the opposite charge of the second polymeric particle may be engendered by the charge borne by certain functional groups of the respective polymer in the aqueous medium; for example copolymerized carboxylate groups may contribute a negative charge to the particle and certain copolymerized quaternary amino groups may contribute a positive charge to a particle. In addition charge on a particle may be engendered by copolymerized or adsorbed surfactant molecules, dispersants, and the like. The net charge on the particle is the charge pertinent to the forming of the composite particle. The net charge on a particle in an aqueous medium may be determined by measurement of the zeta potential as is known in the art and has been disclosed, for example, in U.S. Pat. No. 5,663,224. It is also contemplated that forces in addition to the ionic forces holding the composite particle together may be operative in some cases such as, for example, VanderWaal's forces, Hydrogen bonding forces, and dipole-dipole interactions.

In one embodiment of the present invention the composite particles including the first and the second polymer particles are further contacted with an aqueous dispersion of pigment particles having a diameter of from 10 nm to 5 microns, the pigment particles bearing a charge opposite to that of the composite particles; wherein the ratio of the weight of the pigment particles to the weight of the composite particle is from 0.1 to 10. Suitable pigment particles which, in aqueous dispersion may bear a positive or a negative charge, such as is opposite to the net charge on the formed composite particles, include calcium carbonate, calcium sulfate, barium sulfate, mica, clay, calcined clay, feldspar, nepheline syenite, wollastonite, diatomaceous earth, alumina silicates, talc, and mixtures thereof. The inorganic particles may have a particle diameter which is from 10 nm to 5 microns, preferably from 10 nm to 3 microns.

It is contemplated that a substrate, such as for example, paper, paperboard, wood, metal, and polymer, may coated with a coating composition including the composite particles of the present invention. The voids included in the composite particles serve to provide opacity, insulating properties, and wax holdout to the coating.

In the present invention a thermosensitive recording material and a method for forming the thermosensitive recording material are provided. The composite particles of the present invention are incorporated into an insulating layer intermediate between a support, typically paper, and a thermosensitive recording layer. The technology for forming thermosensitive recording materials has been described in, for example, U.S. Pat. Nos. 4,925,827; 4,929,590; 6,780,820 and Patent Application Publication WO 2008006474. However, prior disclosed thermosensitive recording materials may be deficient in wax build-up on print heads. Without being bound by a particular theory, it is believed that enhanced wax absorption of the insulating layer leads to less wax at the surface of the thermosensitive recording layer, and, hence, less wax build-up on the print heads leading to desirably lower maintenance requirements.

The examples which follow illustrate aspects of the present invention.

EXAMPLE 1

Preparation of Composite Particles

To a mixture of Ropaque™ AF-1055 emulsion polymer (first polymeric particles having a diameter of 1 micron with a core including, when dry, at least one void and a shell polymer having a calculated Tg greater than 50° C.) and water, the cationic Primal™ PR-26 (a quaternary ammonium functional cationic emulsion polymer, total solids=30%, particle diameter=0.1 micron, having a minimum film-forming temperature of greater than 20° C.) or Acryjet™-3826 (an acrylic latex that has quaternary amine group attached to the polymer backbone; particle diameter=0.1 micron, having a minimum film-forming temperature of greater than 20° C.) was added drop-wise with constant stirring using a bench-top mixer. The initial phase of the addition resulted in thickening of the mixture, but continued addition of Primal™PR-26 or Acryjet™-3826 with mixing for 10-15 minutes resulted in reduced viscosity to give pourable liquids. In the case of Sample 1-A (with Primal™ PR-26), Acumer™ 9400 was added, stirring continued for an additional 15 minutes. Both products A and B were left overnight on a roller-mill for further mixing. Scanning electron micrographs ("SEMs") of samples 1-A and 1-B exhibited composite particles composed of a larger central spherical particle on which were disposed a plurality of smaller spherical particles.

TABLE 1.1

Preparation of composite particles

| % solids | Component | 1-A Parts (grams) | 1-B Parts (grams) |
|---|---|---|---|
| 42.6 | Acumer ™9400 | 0.15 (0.35) | 0 |
| 26.5 | Ropaque ™ AF-1055 | 75 (283) | 75.0 (31.1) |
| 29.1 | Primal ™ PR-26 | 25 (85.9) | |
| 29.6 | Acryjet ™-3826 | | 25 (9.3) |
| | water | (46.5) | (6.9) |
| | % Solids | 24.1 | 23.3 |
| | Total | 415.8 grams | 47.3 grams |

EXAMPLE 2

Preparation of Comparative Ropaque™ AF-1055/Mineral Pigment Co-Structures using Kymenetm Solution Polymer Adhesive:

To a mixture of Ropaque™ AF-1055 emulsion polymer and water, Kymene™ G3 Xcel was added drop-wise with constant mixing. Addition of Kymene™ resulted in severe thickening of the Ropaque™ AF-1055 emulsion polymer (to a consistency of a very thick paste) causing the mixer blade to slow down or even stop. To the above mixture, mineral pigment slurries were added slowly with aid of slow but continuous mixing. After about 10-15 min. mixing, Acumer™9400 was added and stirring/ mixing continued for an additional 10-15 min. followed by overnight mixing on a roller-mill. Co-structure 2-D made with precipitated calcium carbonate (Jetcoat™-30) exhibited thick, cream-like consistency. Co-structure 2-C made with nano colloidal silica remained thin, liquid-like consistency.

TABLE 2.1

Preparation of comparative co-structures

| % slds | Component | 2-C Parts (grams) | 2-D Parts (grams) |
|---|---|---|---|
| 42.6 | Acumer ™-9400 | 0.15 (0.04) | 0.15 (0.04) |
| 17.9 | Klebosol ™ Silica 120 | 33.3 (20.5) | 0 |
| 25.6 | Ropaque ™ AF-1055 | 66.7 (27.7) | 50.0 (20.8) |
| 16 | Kymene ™ G3 Xcel | 2.0 (1.4) | 1.5 (1.0) |
| 24.4 | Jetcoat ™-30 | 0 | 50 (22.5) |
| | Water | (0.5) | (2.7) |
| | Total Amount | 50.1 grams | 47.0 grams |
| | % Solids of the product | 22.43 | 23.77 |
| | Product consistency | Liquid-like | Viscous cream-like |

EXAMPLE 3

Preparation of Coatings

Coating draw-down procedure: The composite particles or other pigment slurries such as Jetcoat™-30, Ropaque™ AF-1055, etc. were mixed with a small quantity of latex binders (ca. 2-3 drops of latex binder for 3-5 grams of the slurry for good adhesion to the substrate) and were hand-drawn on either paper or Mylar™ sheets using wire-wound rods (#3-5) and dried for 30-60 sec. in an oven at 81° C. The dried coating samples were used for SEM analysis and Wax absorption studies.

EXAMPLE 4

Preparation of Paper Coatings Formulations and Coating Draw-Downs:

Paper coating formulations were made using Ropaque™ AF-1055 and its composite particles according to the following Tables 4.1 and 4.2. These coatings were hand drawn on paper substrate (6×9 sq. inches; freesheet, basis weight: 60 lbs/3300 sq. feet) using a wire-wound coating rod (#5), dried in the oven at 81° C. for 1 min. Coat weights of these coated sheets were about 1.5-3 lbs/3300 sq. feet (a typical range for this type of coatings having high amounts of hollow-sphere pigments: their SEMs indicated that the paper surfaces were well covered with the coating and coating thickness also ranged from 7-9 microns, again quite typical for these type of coatings and coat weights).

TABLE 4.1

Paper Coatings with Ropaque ™ AF-1055/Primal ™ PR-26 composite particles and their formulation details

| Coating Component | 4-1 Parts | 4-2 Parts | 4-3 Parts | 4-4 Parts | 4-5 Parts | 4-6 Parts |
|---|---|---|---|---|---|---|
| Ansilex ™ (Calcined Clay) | 0.00 | 0.00 | 20.00 | 20.00 | 0.00 | 0.00 |
| HC-90 (calcium carbonate) | 0 | 0 | 0 | 0 | 20 | 20 |

TABLE 4.1-continued

Paper Coatings with Ropaque ™ AF-1055/Primal ™ PR-26 composite particles and their formulation details

| Coating Component | 4-1 Parts | 4-2 Parts | 4-3 Parts | 4-4 Parts | 4-5 Parts | 4-6 Parts |
|---|---|---|---|---|---|---|
| Ropaque ™ AF-1055/ PR-26 co-structure | 100.0 | 100.0 | 80.0 | 80.0 | 80.0 | 80.0 |
| Genflo ™-557 | 25 | 0 | 25 | 0 | 25 | 0 |
| Rhoplex ™ P-308 | 0 | 25 | 0 | 25 | 0 | 25 |
| Total parts | 125 | 125 | 125 | 125 | 125 | 125 |
| Actual solids | 16 | 23 | 16 | 19 | 17 | 23 |

TABLE 4.2

Comparative Paper Coatings with AF-1055 and their formulation details

| | Comparative Coating | | |
|---|---|---|---|
| Component | 4-E Parts | 4-F Parts | 4-G Parts |
| Ansilex ™ (Calcined Clay) | 0.00 | 20.00 | 0.00 |
| HC-90 (calcium carbonate) | 0 | 0 | 20 |
| Ropaque ™ AF-1055 | 100.0 | 80.0 | 80.0 |
| Rhoplex ™ P-308 | 25 | 25 | 25 |
| Total parts | 125 | 125 | 125 |
| Actual Solids | 29 | 31 | 32 |

EXAMPLE 5

Wax Absorption Test

Candle wax (nip: 70° C.) was heated to about 75° C., and a drop of melted candle wax was placed on a coated paper sample (2×2 sq. inch) at room temperature. As some of the hot, melted wax penetrated into the coating surface, the wax drop quickly cooled down to solidify and stuck to the paper. The solidified wax drop was equilibrated at room temperature for about 3 minutes to harden and then it was flicked-off the paper surface using a spatula. The wax-stain under the wax droplet indicated the extent of wax penetration: the darker the stain or spot, the higher the wax penetration. In addition to the visual observation, the dark/light appearance of the stain was quantified using a hand-held color densitometer (X-Rite™ 418): a darker stain/spot gave a higher optical density number versus a lighter stain or the paper background itself: the optical density numbers reported here are difference between the optical densities of the wax stain and the paper background. Tables 5.1 and 5.2 present the optical density numbers.

TABLE 5.1

Wax absorption data

| Coating including Sample | Optical Density |
|---|---|
| Ropaque ™ AF-1055 | 0.08 |
| 1-B | 0.18 |

TABLE 5.1-continued

Wax absorption data

| Coating including Sample | Optical Density |
|---|---|
| 2-C | 0.09 |
| 2-D | 0.08 |

Coatings including composite particles 1-A exhibit wax absorption superior to that of coatings including Comparative particles 2-C and 2-D or first polymeric particles (Ropaque™ AF-1055) alone

TABLE 5.2

Wax absorption data

| Coating including sample | Optical Density |
|---|---|
| Ansilex ™ clay | 0.10 |
| 4-1 | 0.13 |
| 4-2 | 9.13 |
| 4-3 | 0.14 |
| 4-4 | 0.14 |
| 4-5 | 0.12 |
| 4-6 | 0.14 |
| 4-E | 0.04 |
| 4-F | 0.04 |
| 4-G | 0.04 |

EXAMPLE 6

Preparation of Composite Particles with Mineral Pigments

To a mixture of sample 1-B and water, mineral pigment slurry Jetcoat™-30 was added slowly with constant stirring using a bench-top mixer. The initial phase of the addition resulted in thickening of the mixture, but continued addition of the pigment with mixing for 10-15 minutes resulted in reduced viscosity to give pourable, but thick liquids in both cases. Mixing was maintained continued for an additional 15 minutes. The products 6-1 was left overnight on a roller mill for further mixing before coating on Mylar™ for SEM analysis. The SEM of sample 6-1 exhibited composite particles composed of a larger central spherical particle on which were disposed a plurality of smaller particles.

TABLE 6.1

Preparation of composite particles

| Sample % solids | | 6-1 Parts (grams) |
|---|---|---|
| 23.3 | Sample 1-B | 50 (22.6) |
| 24.4 | Jetcoat ™-30 | 50 (24.6) |
| | Water | (0.8) |
| | Total Amount (grams) | 47.0 |
| | Actual Solids | 24.0 |

Ropaque™ AF-1055, Primal™ PR-26, Acryjet™-3826, Acumer™-9400, Rhoplex™ P-308 were all products of Rohm and Haas Company. Kymene™ was obtained from Hercules, Inc. (DE, USA). JetCoat™-30 slurry (PCC-precipitated calcium carbonate) was obtained from Specialty Materials Inc (PA, USA). Genflo™-557 (a styrene-butadiene latex binder) was obtained from Omnova Solutions (OH, USA).

What is claimed is:

1. A method for forming a composite particle comprising:
(a) forming a first aqueous dispersion comprising a first polymeric particle having a diameter of from 100 nm to 3.5 microns comprising a core and a shell, said first polymeric particle bearing a first charge;
said core comprising, when dry, at least one void; and
said shell polymer having a calculated Tg greater than 50° C.;
(b) forming a second aqueous dispersion comprising a second polymeric particle, said second polymeric particle bearing a charge opposite to that of said first polymeric particle, said second polymeric particle having a minimum film-forming temperature of greater than 20° C.; and
(c) admixing said first aqueous dispersion and said second aqueous dispersion;
wherein the ratio of the diameter of said first polymeric particle to the diameter of said second polymeric particle is from 1 to 50;
wherein the ratio of the weight of said first polymeric particle to the weight of said second polymeric particle is from 0.1 to 40.

2. The method of claim 1 further comprising
(d) then contacting said admixture with an aqueous dispersion of pigment particles having a diameter of from 10 nm to 5 microns, said pigment particles bearing a charge opposite to that of the composite particles of said admixture;
wherein the ratio of the weight of said pigment particles to the weight of said composite particle is from 0.1 to 10.

* * * * *